United States Patent [19]

Hipps

[11] 4,174,869
[45] Nov. 20, 1979

[54] ELECTRO-HYDRAULIC BRAKE ACTUATING SYSTEM

[76] Inventor: Larry W. Hipps, 506 Colorado St., Sherman, Tex. 75090

[21] Appl. No.: 899,262

[22] Filed: Apr. 24, 1978

Related U.S. Application Data

[62] Division of Ser. No. 742,854, Nov. 18, 1976.

[51] Int. Cl.$^2$ .......................... B60T 13/10; B60T 7/20
[52] U.S. Cl. .................................. 303/10; 188/112 R; 303/46; 303/63; 251/129
[58] Field of Search ...................... 188/112; 303/7, 10, 303/11, 20, 44, 46, 63

[56] References Cited

U.S. PATENT DOCUMENTS

| | | | |
|---|---|---|---|
| 1,792,895 | 2/1931 | Cowlishaw | 303/63 |
| 2,876,045 | 3/1959 | Kendig | 303/63 |
| 3,077,248 | 2/1963 | Wayt | 188/112 |
| 3,114,440 | 12/1963 | Perrotto | 303/63 X |
| 3,570,633 | 3/1971 | Garnett | 188/112 |

*Primary Examiner*—Duane A. Reger
*Attorney, Agent, or Firm*—Richards, Harris & Medlock

[57] ABSTRACT

A brake actuating system especially useful for applying the brakes of a towed vehicle concurrently with application of braking pressure in the towing vehicle is provided which includes a variable valve means interconnected to the towed vehicle's conventional type hydraulic brakes. The variable valve means controls the pressure applied to the brakes of the towed vehicle in response to variable electric current which is supplied via a variable current source which is interconnected to the brakes of the towing vehicle. Also provided, is a breakaway safety device which upon physical separation of the towed vehicle from the towing vehicle causes hydraulic pressure to be supplied automatically to the hydraulic brakes of the towed vehicle.

2 Claims, 4 Drawing Figures

ELECTRO-HYDRAULIC BRAKE ACTUATING SYSTEM

This is a division of application Ser. No. 742,854 filed Nov. 18, 1976.

This invention relates to a brake actuating system wherein varied electric current is translated first to mechanical action via an electromagnet which controls the position of a valve stem within a variable valve means, and, secondly, to hydraulic pressure as said variable valve means restricts the flow of hydraulic fluid therethrough. In another aspect, this invention relates to a brake actuating system for use in conjunction with a towing vehicle-towed vehicle combination, whereby increased braking pressure in the towing vehicle is communicated to the brake actuating system of the towed vehicle via increasing electric current which by means of a unique electromagnetic variable valve means is translated to increased hydraulic pressure delivered to hydraulic brakes of the towed vehicle. In still another aspect, the present invention relates to an electromagnetic variable valve means which, in response to increasing electric current, causes an increase in pressure to the brakes of a towed vehicle. A further aspect of the present invention relates to a unique breakaway device, which, upon physical separation of the towing vehicle from the towed vehicle supplies instantaneous hydraulic pressure to the hydraulic brakes of the towed vehicle.

BACKGROUND OF THE INVENTION

Until recently braking systems employed in connection with towed vehicles such as horse trailers, for example, were usually one of three conventional types of systems. These include: electric braking systems, surge hydraulic braking systems, and vacuum over hydraulic braking systems. The electric type braking system conventionally includes electromagnets mounted inside the brake drum of each wheel of the towed vehicle, which upon application of electric current attach themselves to an armature plate mounted inside the brake drum. The rotating motion of the wheel then carries the attached electromagnet with it causing an armature attached to the electromagnet to rotate and expand braking bands against the brake drum. Electric current to the electromagnet is supplied via a rheostat activated by hydraulic pressure from the brakes of the towing vehicle or by a hand control mounted in the passenger compartment of the towing vehicle. The disadvantages of such a system include the fact that during normal operation, braking pressure is supplied first to the hydraulic brakes of the towing vehicle and then, as the electric brakes of the towed vehicle are activated, a noticeable lurch occurs which may affect the control of the operator of the towing vehicle during braking. Further, variance in electromagnetic strength among the electromagnets in each wheel may cause uneven braking and further control problems. Such a system is also prone to electrical wiring problems because electrical wires carrying current to each electromagnet are exposed between the wheel and the frame of the towed vehicle. Finally, while such electrical braking systems are sometimes supplied with an emergency breakaway kit, which includes a nonrechargeable dry cell battery which automatically completes the circuit to the electromagnet upon physical separation of the towed and towing vehicles, these emergency breakaway systems are completely dependent on the performance of such dry cell batteries which may, over a period of time, lose sufficient charge to properly activate the electric brakes.

A second type of conventional braking system used in conjuction with towed vehicles are surge hydraulic brakes. These types of systems conventionally include a piston and cylinder mounted between the towed vehicle and the towing vehicle in a manner such that when the brakes of the towing vehicle are applied, the momentum of the towed vehicle causes the piston to move into the cylinder resulting in hydraulic pressure which is transferred to the hydraulic brake cylinders of the towed vehicle. Disadvantages of this type of system include the apparent fact that in case of brake failure in the towing vehicle, no trailer brake pressure may be applied. Further, there is no provision for hand activation of such a system, thus making this type of system illegal under the relevant laws of some states. As is also apparent from the foregoing brief description of a conventional surge hydraulic braking system, full braking power is applied to the towed vehicle when the towing vehicle is operated in a reverse gear, whether such braking is desired or not.

The third type of conventional braking system is the vacuum over hydraulic brake system. This type of system conventionally includes a vacuum chamber, containing a diaphragm, mounted in the towed vehicle to which vacuum is supplied from the intake manifold of the engine of the towing vehicle. Upon activation of this type of braking system atmospheric pressure is allowed to enter one side of the vacuum chamber, thus causing the diaphragm to expand into the evacuated side of the chamber, thereby mechanically moving a rod attached to the diaphragm which advances a piston in the master cylinder and creates hydraulic pressure to the hydraulic brakes of the towed vehicle. Release of the braking pressure is accomplished by reestablishment of a vacuum on both sides of the diaphragm within the vacuum chamber. The disadvantages of such a system include the necessity of leak proof vacuum lines to the vacuum source (usually the engine of the towing vehicle) and the fact that the operation of such systems is relatively slow causing a time difference between the application of the brakes of the towing vehicle and those of the towed vehicle. As is also apparent, complete loss of brakes in the towing vehicle will occur in the event of engine failure or a separation or leak in the vacuum lines leading to the towed vehicle.

SUMMARY OF THE INVENTION

The electro-hydraulic brake actuating system of the present invention overcomes the disadvantages of presently available trailer brake actuating systems and provides for the smooth application of the brakes of a towed vehicle in response to a like application of the brakes of the towing vehicle. According to the invention, conventional hydraulic brakes in the towed vehicle are actuated simultaneously with the brakes of the towing vehicle in response to increasing electric current supplied to a novel variable valve means which comprises a portion of the braking system of the present invention, the increasing electrical current being supplied from the battery or other power source of the towing vehicle, via an electric current varying means such as, for example, a rheostat. Thus, the towed vehicle is slowed via conventional hydraulic brakes without the necessity of any hydraulic connection between the towed and towing vehicles. Further, a breakaway device is provided which supplies hydraulic pressure to the brakes of the towed vehicle via a spring loaded piston-cylinder arrangement which is released upon physical separation of the towed vehicle from the towing vehicle.

Basically, the electro-hydraulic brake actuating system of the present invention comprises the following components. The towing vehicle is supplied with a means for varying electric current, such as a rheostat, for example, which is interconnected with the battery or other electrical power source of the towing vehicle. Two electrical wires carry current from the towing vehicle to the towed vehicle, electrical connection between the two vehicles being accomplished using any of a variety of conventional electrical connection devices. The first electrical wire carrying electric current to the towed vehicle is connected to a direct current electrical motor mounted in the towed vehicle. The second electrical wire, which interconnected to the current varying means in the towing vehicle leads to the electromagnet of the novel variable valve means of the present invention to be described in detail below. The direct current electric motor is used to drive a mechanical hydraulic pumping means, such as a gear pump, for example. Thus, once electric current is supplied to this first electric wire, the direct current electric motor drives the hydraulic pumping means which in turn is interconnected hydraulically with hydraulic fluid lines leading to conventional hydraulic brake cylinders located in each wheel of the towed vehicle. The aforementioned variable valve means is interconnected hydraulically between the outlet of said hydraulic pumping means and the inlet thereof, in a manner such that hydraulic fluid flowing out of the outlet of the hydraulic pumping means and to the hydraulic wheel cylinders must flow through said variable valve means before it can return to the inlet side of the hydraulic pumping means. Thus, upon application of electrical current to the direct current electric motor via the electrical connection between the two vehicles, the hydraulic pumping means begins to circulate fluid which flows from the outlet of said pumping means to the hydraulic brake cylinders located in each wheel of the towed vehicle and thence through the variable valve means and back to the inlet of the pumping means, or a reservoir hydraulically connected to said inlet. Upon application of electric current to the electromagnet of the variable valve means, flow through said valve means is restricted incrementally in response to the amount of electric current supplied to the electromagnet. As flow through the variable valve means becomes so restricted, there will be a resulting increase in hydraulic pressure supplied to the wheel cylinders of the towed vehicle, because hydraulic fluid, being pumped at a substantially constant rate by the hydraulic pumping means, will not be allowed to return to the inlet of the pumping means at the same rate at which said hydraulic fluid is being supplied to the hydraulic lines leading to the wheel cylinders. Thus, by supplying electric current to the direct current electric motor at the same instant at which the brakes of the towing vehicle are applied a slight pressure can be supplied to the hydraulic wheel cylinders of the towed vehicle, this initial pressure being controlled by the relationship of the pumping rate of the hydraulic pumping means to the orifice size of the variable valve means in its completely open position. When further braking pressure is applied in the towing vehicle, varible electric current is supplied to the electromagnet in the variable valve means causing a further restriction in the circulation of hydraulic fluid through the system, with the resulting increase in braking pressure supplied to the hydraulic wheel cylinders of the towed vehicle which is proportional to the amount of electric current supplied to the electromagnet of the variable valve means.

In a preferred embodiment of the present invention, a breakaway device is connected hydraulically to the wheel cylinders of the towed vehicle. This breakaway device, affixed to the towed vehicle, is connected to the towing vehicle via a chain or cable so that upon separation of towed vehicle from towing vehicle, the chain or cable will mechanically pull an activating pin which will cause the breakaway device to deliver hydraulic pressure to the wheel cylinders of the towed vehicle, thereby bringing it to a halt. Basically, the breakaway device of the present invention comprises a cylinder with a spring loaded piston therein which is normally kept in a compressed state. When the aforementioned activating pin is pulled, because of separation of the two vehicles, the spring loaded piston within the cylinder is released and the expansion of the spring is translated into hydraulic pressure within the cylinder which pressure is then applied to the hydraulic wheel cylinders of the towed vehicle.

The electromagnetic variable valve means of the present invention basically comprises a valve housing which has an inlet hydraulically connected to the outlet of the hydraulic pumping means and an outlet hydraulically connected to the inlet of the hydraulic pumping means. Mounted within the valve housing is a valve stem block having an aperture therethrough which slidably receives a valve stem therein. The valve stem which is slidably mounted within the aperture in the valve stem block is generally of a cylindrical shape and includes a conical end portion which is received in a conical valve stem seat adjacent the inlet of the valve stem housing. Thus, hydraulic fluid flowing into the variable valve means via its inlet passes through the conical valve stem seat into the valve housing and out of the inlet thereof. As the conical end of the valve stem is moved into the valve stem seat (the valve stem and valve seat being axially aligned), the cross sectional area of the valve stem seat through which fluid may flow decreases. If the conical end of the valve stem is completely seated in the conical valve stem seat, substantially no fluid would be allowed to pass through the inlet of the variable valve means and into the valve housing. The cylindrical valve stem extends upward through the aperture provided therefor in the valve stem block and the upper end of the valve stem extends for a predetermined distance out of the upper end of the aperture of the valve stem block. A plate, made of magnetic material which can, for example, be circular in shape, rests on top of the upper end of the valve stem. Electromagnetic windings are placed annularly around the valve stem block and are connected to the aforementioned variable current source.

The operation of this electromagnetic variable valve means can be briefly described as follows. Upon application of fluid pressure via the hydraulic pumping means, hydraulic fluid will begin to flow into the inlet of the valve housing. The pressure initially present will be such as to lift the conical end of the valve stem out of its normally seated position in the valve stem seat. Thus, as fluid begins to flow into the inlet the valve stem is, in effect, floated from a seated position by the pressure of the hydraulic fluid entering the inlet of the valve. If no electric current is supplied to the electromagnet of the variable valve means, the hydraulic fluid will simply circulate through the inlet of the valve housing, past the conical end of the valve stem and out the outlet of the valve housing. However, upon application of electric current to the electromagnetic windings surrounding the valve stem block, the aforementioned plate of magnetic material resting on top of the upper end of the valve stem will be attracted to the electromagnetic windings and the valve stem block itself. As the plate moves downward toward the electromagnetic windings and the valve stem block its motion pushes the valve stem downward through the valve stem aperture in the valve stem block causing the lower conical end of the valve stem to move towards a seated position in the conical valve stem seat adjacent the inlet of the valve housing. In this manner, the rate of flow of fluid through the variable valve means may be controlled as a function of the amount of electric current supplied to the electromagnetic windings of the variable valve means. Increased electric current will cause the magnetic plate to move farther towards the electromagnetic windings causing the conical end of the valve stem to move downward into the valve stem seat thereby increasingly restricting the flow of fluid through the variable valve means. It is this transference of increasing electrical current to increasing restriction of fluid flow through the valve which allows the variable valve means of the present invention to cause increasing hydraulic pressure to be applied to the hydraulic wheel cylinders of the towed vehicle.

BRIEF DESCRIPTION OF THE DRAWINGS

A better understanding of the present invention will be facilitated by a study of the accompanying drawings in which.

DETAILED DESCRIPTION

Figure 1:
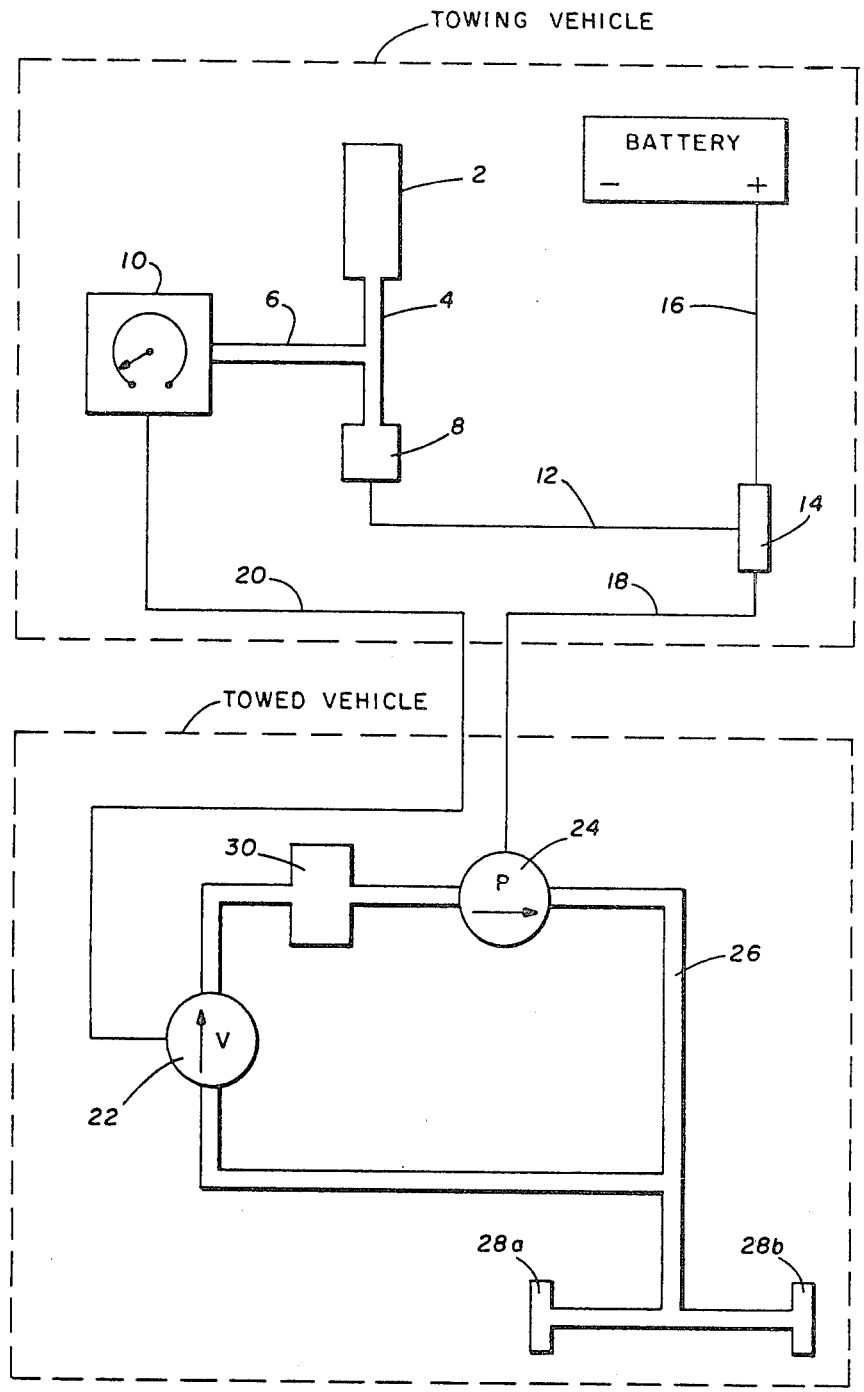
FIG. 1 is a schematic representation of the electro-hydraulic brake actuating system of the present invention.

Referring to FIG. 1 a schematic representation of one embodiment of the electro-hydraulic brake actuating system of the present invention is depicted. In the drawing, the conventional master cylinder 2 of a towing vehicle having conventional type hydraulic brakes is shown connected hydraulically via hydraulic lines 4 and 6 to stop light switch 8 and an electric current varying means 10 such as, for example, a rheostat or other variable resistor means. Stop light switch 8 is connected via electric wire 12 to a solenoid switch 14 which, in turn is connected via electric wires 16 and 18 to the battery or other power source of the towing vehicle and a direct current electric motor located in the towed vehicle, respectively. Electric wire 20 carries the output from current varying means 10 to the electromagnet of variable valve means 22 located in the towed vehicle. Thus, electrical wires 20 and 18 are the only electrical connections necessary (other than conventional types of trailer brake light apparatus) between towing vehicle and towed vehicle. These connections may be made by any of various types of conventional electrical connectors, such as those used in connecting brake light wiring between towing vehicle and towed vehicle.

Hydraulic pumping means 24 located in the towed vehicle is connected mechanically with the direct current electric motor (not shown) which is supplied with current via electric wire 18. Hydraulic pumping means 24 circulates fluid through outlet hydraulic line 26 to the hydraulic wheel cylinders of the towed vehicle schematically represented here as 28a and 28b. Of course, any number of hydraulic wheel cylinders may be supplied by hydraulic fluid from output hydraulic line 26. As shown in the drawing, in order for hydraulic fluid to be circulated to hydraulic fluid reservoir 30 and pumped therefrom back through the hydraulic loop, the hydraulic fluid must flow through variable valve means 22.

The schematic representation of the electro-hydraulic brake actuating system of the present invention depicted in FIG. 1 can be operated in the following manner. When the driver of the towing vehicle applies the hydraulic brakes of the towing vehicle, the resulting pressure in master cylinder 2 will be transmitted via hydraulic line 4 to brake light switch 8, which in turn will supply electric current via electrical wire 12 to solenoid switch 14. Solenoid switch 14 will then move to a closed position completing the electrical circuit between the battery of the towing vehicle and the direct current motor in the towed vehicle, which is mechanically interconnected with hydraulic pumping means 24. Thus, upon application of the brakes of the towing vehicle, hydraulic pumping means 24 will begin to circulate fluid through outlet hydraulic line 26 and to hydraulic wheel cylinders 28a and 28b. Further, hydraulic pressure in hydraulic line 6 in the towing vehicle, which will increase with increased pressure in master cylinder 2 will cause the electric current varying means 10 to supply increasing electric current via electric wire 20 to the variable valve means 22 in the towed vehicle. Thus, the increasing electric current, which increases in response to increased braking pressure in the towing vehicle, will cause variable valve means 22 to gradually close in response thereto restricting the flow of hydraulic fluid through the valve and thereby increasing the pressure in hydraulic wheel cylinders 28a and 28b. In this manner, increasing brake pressure in the towing vehicle is translated to increasing electric current output from variable electric current means 10, which in turn is translated into increasing braking pressure in the towed vehicle as a result of the increasingly restricted hydraulic flow through variable valve means 22.

Thus, at the first instant of application of the brakes of the towing vehicle, hydraulic pumping means 24 begins to circulate fluid through the hydraulic system of the towed vehicle resulting in a slight initial pressure being exerted in hydraulic wheel cylinders 28a and 28b thus beginning to brake the towed vehicle. The amount of initial braking pressure caused in this manner can easily be controlled and predetermined by adjusting the pumping rate of hydraulic pumping means 24 and the orifice size of the inlet of variable valve means 22 when the variable valve means 22 is in a full open position. For example, if no initial braking pressure is desired, the pumping rate of hydraulic pumping means 24 can be set at a relatively low value and the orifice size of variable valve means 22 in its open position can be constructed so that there is no substantial restriction of free hydraulic flow through the hydraulic system of the towed vehicle. Upon further braking action by the driver of the towing vehicle, the electromagnet of the variable valve means 22 (to be described in detail below) causes flow through the hydraulic system of the towed vehicle to be restricted resulting in increasing braking pressure in the towed vehicle simultaneously with the increase in braking pressure being applied in the towing vehicle. It is noted that a hand control means for electric current varying means 10 can be mounted in the passenger compartment of the towing vehicle, so that upon advancement of such hand control means the brakes of the towed vehicle can be applied without applying the brakes of the towing vehicle. Of course, in such a case the hand control would also be connected electrically to solenoid switch 14, so that the direct current electric motor, driving hydraulic pumping means 24, would be activated upon use of the hand control.

Figure 2:
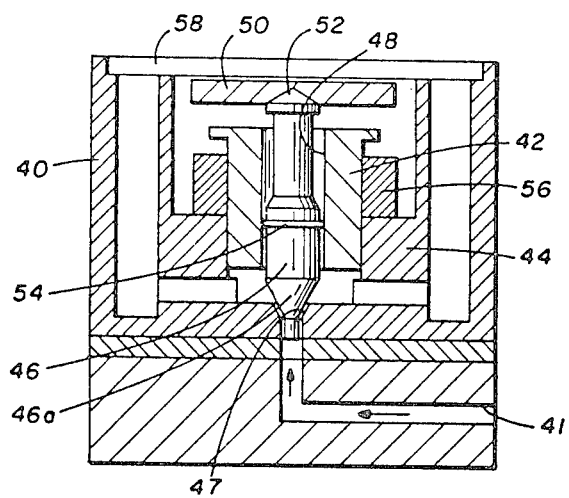
FIG. 2 is a sectional view of one embodiment of the novel electromagnetic variable valve means of the present invention.

Referring to FIG. 2, a preferred embodiment of an electromagnetic variable valve means useful in the present invention as variable valve means 22 in FIG. 1 will be described. Generally, the electromagnetic variable valve means of the present invention includes a valve housing having an inlet and an outlet with an electromagnetically controlled valve stem interposed between said inlet and outlet to thereby control the rate of flow of hydraulic fluid through the valve. Referring to FIG. 2, valve housing 40 is shown in cross section and can generally be of any shape including, for example, cylindrical. A valve stem block 42 is positioned within valve housing 40 by valve stem block locating means, such as, for example, valve stem block locating means 44 as depicted. A valve stem 46 is slidably mounted within a valve stem aperture 48 which extends through valve stem block 42. Valve stem 46 is generally of a cylindrical elongated shape, the lower end 46a thereof being conical in shape. Lower end 46a of valve stem 46 can also include a cylindrical projection 46b extending from the apex of the conical shaped lower end 46a. As shown, lower end 46a of valve stem 46 is received in a conical valve stem seat 47 adjacent the inlet 41 through which hydraulic fluid enters the valve. A plate 50 of magnetic material rests on top of the upper end 52 of the valve stem 46. In the preferred embodiment of valve stem 46 depicted in FIG. 2, the midsection of the valve stem is expanded to a larger circumference than the upper portion thereof and includes an annular sealing means 54, such as an O-ring for example. Upper end 52 of valve stem 46 can be conical in shape, as shown, and plate 50 can have a conical indentation in the center thereof to insure that the plate 50 will stay in position atop valve stem 46.

Located annularly around the valve stem block 42 is electromagnet means 56 which is electrically connected to the supply of variable electric current 10 referred to in FIG. 1. Electromagnet means 56 can be fabricated in a known manner by winding electrical wire around valve stem block 42 or any other known type of electromagnetic device can be fabricated so as to fit annularly around valve stem block 42. A valve housing top 58 can be provided to enclose the electromagnetic valve means as a sealed unit.

The operation of the electromagnetic valve means of this invention can generally be described as follows.

When no hydraulic fluid is being pumped into the valve means via valve inlet 41, the lower end 46a of valve stem 46 rests in a closed position in conical valve stem seat 47. Upon initiation of hydraulic pressure, hydraulic fluid will begin to circulate into inlet 41 and cause valve stem 46 to "float" upward to allow hydraulic fluid to flow through conical valve stem seat 47 and into the valve housing 40. If electromagnet means 56 is not activated by applying electric current thereto, hydraulic fluid will flow into valve housing 40 via inlet 41 through conical valve seat 47 and around lower end 46a of valve stem 46, circulate through the valve housing, and out of the valve housing via its outlet (not shown). Upon application of electric current to electromagnet means 56, the electromagnetic field produced thereby will begin to attract magnetic plate 50 downward towards valve stem block 42 and electromagnet means 56. The movement of plate 50 in this direction will cause valve stem 46 to slide downward within valve stem aperture 48 causing lower end 46a to move progressively towards a seated position in valve stem seat 47. If sufficient electric current is supplied to create a strong magnetic field the magnetic attraction will cause plate 50 to move downward until lower end 46a of valve stem 46 becomes completely seated in valve stem seat 47 adjacent the inlet. When this occurs, all hydraulic fluid flow through inlet 41 into the valve housing 40 will be blocked thereby creating back pressure which is transmitted via hydraulic lines to the hydraulic wheel cylinders in the brakes of the towed vehicle causing maximum braking action to occur.

As discussed above in relation to FIG. 1, when an increasing electric current is supplied to electromagnet means 56, which increases in response to increasing brake pressure applied in the towing vehicle, valve stem means 46 will move smoothly toward a seated position and the hydraulic brakes of the towed vehicle will thus be applied in sequence with those of the towing vehicle. When the brakes in the towing vehicle are released, the flow of electric current to electromagnet means 56 will cease, thus releasing plate 50 from magnetic attraction and allowing the pressure exerted by hydraulic fluid flowing into inlet 41 to raise valve stem 46 from a seated position to an open position, thereby releasing the brakes of the towed vehicle.

It should be noted that the electromagnetic valve means of the present invention may be modified in a manner such that its parts are easier to mass produce without departing from the concept of the present invention. For example, electromagnet means could be provided around a piston like assembly slidably mounted within a cylinder, such that upon application of electric current to the electromagnet means, the entire piston assembly would be attracted downward towards a magnetic surface at the bottom of the cylinder, thereby moving a valve stem means extending through an aperture in the bottom of the cylinder downward to control the flow of fluid through the valve in a manner similar to that described above.

Figure 3:
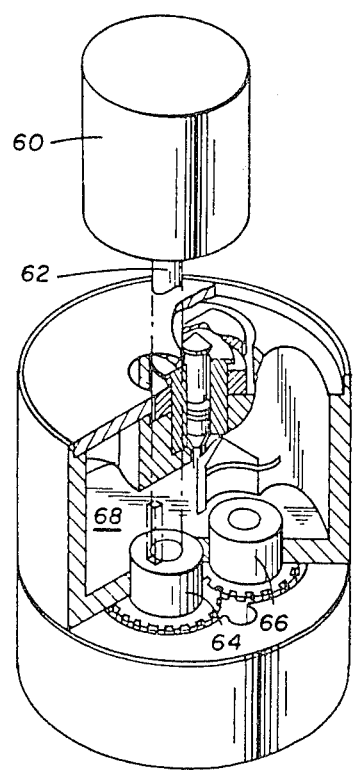
FIG. 3 is a perspective view in partial section depicting a preferred embodiment of the hydraulic pumping means, and electromagnetic variable valve means, wherein these components are contained in a cylindrical hydraulic fluid reservoir.

Referring to FIG. 3, a preferred embodiment of the present invention is shown wherein the electromagnetic variable valve means previously described is located within an enclosed hydraulic fluid reservoir which, in turn, is positioned on top of a conventional type gear pump employed as the hydraulic pumping means of the present invention. Thus, a direct current electric motor 60 (shown schematically) is connected via drive shaft 62 to drive gear 64 of the hydraulic pumping means. Upon application of direct current to electric motor 60, drive gear 64 begins to rotate on its axis, thereby turning gear 66 and providing hydraulic pressure in the hydraulic line (not shown) leading to the wheel cylinders of the towed vehicle. A hydraulic return line, leading from the hydraulic brake cylinders of the towed vehicle to inlet line 41 of the variable valve means described above, causes fluid to flow into the valve via conical valve seat 47 and such flow is controlled by the amount of electrical current supplied to the electromagnet means 56 as described above in relation to FIG. 2. After passing through the valve, the hydraulic fluid exits therefrom via the outlet of the valve and is returned to reservoir area 68 which can comprise a cylindrical container, within which the variable valve means is mounted as shown. Thus, the novel variable valve means of the present invention, the hydraulic pumping employed therewith, and a reservoir for hydraulic fluid can be contained in a compact cylindrical unit which can easily be mounted, along with a direct current electric motor therefor, on the frame of a towed vehicle.

Figure 4:
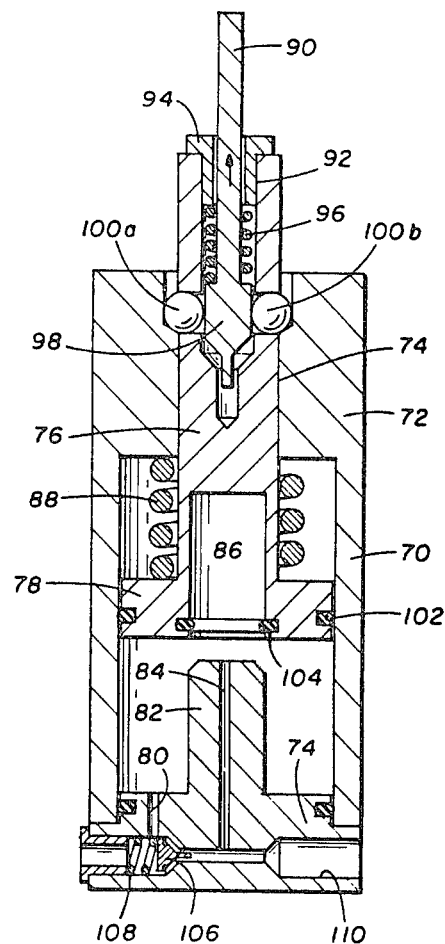
FIG. 4 is a sectional view of the novel breakaway hydraulic brake actuator of the present invention.

Referring to FIG. 4, a novel breakaway device useful in the brake actuating system of the present invention will be described which, upon physical separation of the towed vehicle from the towing vehicle, will automatically supply sufficient hydraulic pressure to the wheel cylinders of the hydraulic brakes of the towed vehicle to bring it to a halt. Generally, the breakaway device includes an elongated cylinder 70 having a top plate 72 and a bottom plate 74. The top plate 72 has a piston rod aperture 74 extending therethrough which slidably receives piston rod 76 which has a piston member 78 affixed to the lower end thereof. Bottom plate 74 includes a fluid outlet aperture 80 extending therethrough and a shaft 82 extending upward therefrom which includes a fluid inlet aperture 84 extending therethrough. Piston rod 76 includes a shaft receiving aperture 86 therein which is axially aligned with shaft 82 extending upward from bottom plate 74. A helical spring means 88 (shown in a state of compression) is located between top plate 72 and piston member 78. A locking pin 90 is mounted within locking pin aperture 92 which extends downward from the top of piston rod 76. Locking pin collar 94 holds locking pin 90 in axial alignment with locking pin aperture 92 and retains a second helical spring 96 (shown in a relaxed position) positioned around locking pin 90. As shown, the lower end of helical spring 96 rests on an expanded portion 98 of locking pin 90 which is of a greater diameter than the upper portion of locking pin 90 and which is conically tapered at the lower end thereof. Locking balls 100a and 100b are spherical in shape and are shown in a locked position.

Of course, piston member 78 can include conventional O-ring sealing members 102 and 104 to provide hydraulic seals between the piston and the walls of elongated cylinder 72 and the piston and shaft 82. Also shown positioned within the hydraulic line 110 connecting the breakaway device hydraulically to the hydraulic pumping means is a one-way valve means 106 which comprises a conical valve stem seated in a conical valve seat and held in position by a spring means 108.

Operation of the breakaway device can be described in the following manner. When the towed vehicle is separated from the towing vehicle unintentionally, a chain or other tying means which is firmly affixed to the towing vehicle at one end and affixed to locking pin 90 at the other causes locking pin 90 to move upward allowing locking spheres 100a and 100b to roll downward and inward out of a locking position, thereby releasing piston rod 76 and the compressive force of helical spring means 88. Thus, piston rod 76 and piston 78 are forced rapidly downward within elongated cylinder 72 forcing hydraulic fluid, under pressure, out of outlet aperture 80 and to the hydraulic brakes of the towed vehicle via a conventional hydraulic brake line leading thereto. Of course, some back pressure created by hydraulic fluid flowing out of inlet aperture 84 extending through shaft 82 will occur until piston 78 moves downward for a sufficient distance, such that shaft receiving aperture 86 mates with shaft 82, thereby sealing the fluid contained in shaft aperture 86 from the remaining fluid present in elongated cylinder 72. The hydraulic pressure exerted by the spring force of helical spring means 88, via piston 78, is sufficient to provide braking pressure to the wheel cylinders of the towed vehicle.

One of the outstanding features of the breakaway device of the present invention is the ease with which the device may be reset after activation, so as to be ready for a second use. All the operator need do is to reconnect the electrical connections between towing vehicle and towed vehicle and operate the towed vehicle's brakes, either by depressing the brakes of the towing vehicle or employing a hand control therein, so as to activate the hydraulic pumping means in the novel braking system of the towed vehicle. The hydraulic pressure supplied by the hydraulic pumping means will enter the breakaway device via hydraulic line 110 and inlet aperture 84 running through shaft 82, thereby exerting pressure on the upper end of shaft receiving aperture 86 located within the piston rod 76. Hydraulic pressure will also be exerted on piston 78 since the braking pressure will be communicated from hydraulic line 110, through one-way valve 106 and into cylinder 70 via outlet aperture 80. Of course, braking pressure will also be exerted on the brakes of the towed vehicle as hydraulic fluid exerts pressure to the brake line via hydraulic line 110 and one-way valve 106. Continued application of braking pressure will cause circulation of fluid up through inlet aperture 84 and outlet aperture 80, exerting hydraulic pressure against the end face of shaft receiving aperture 86 and piston 78. This hydraulic pressure is sufficient to move piston 78 upwards, thereby compressing helical spring means 88 and allowing the locking mechanism to reset itself as follows. Once piston rod 76 has moved upward and spring means 88 has been compressed, locking spheres 100a and 100b will reach their locking positions and be forced outward into locking position by the conical end of lower end 98 of locking pin 90, which in turn is being forced downward by helical spring means 96, which was placed in a compressed state upon activation of the breakaway device by the pulling of locking pin 90 upward. Thus, locking spheres 100a and 100b will roll to a locking position, so that when braking pressure is released, piston 78 and piston rod 76 will remain in a locked position with helical spring means 88 in a compressed state ready for reuse.

The breakaway device previously described is also useful as a safety check on the hydraulic braking system of the towed vehicle. For example, if the breakaway device is activated intentionally by pulling locking pin 90 upward and allowing a hydraulic fluid braking pressure to be exerted on the brakes of the towed vehicle, the towed vehicle will remain in a braked state and cannot be easily moved unless the break away device is reset as described above. Thus, if when the towed vehicle is attached to the towing vehicle and proper electrical connections have been made, the hydraulic pumping means is for some reason inoperable the breakaway device will not be reset by applying the brakes of the towing vehicle and therefore braking pressure in the towed vehicle will not be released. Thus, the breakaway device effectively serves as a safety check to insure that the hydraulic braking system of the towed vehicle is in operating condition.

While this invention has been described in relation to its preferred embodiments, it is to be understood that various modifications thereof will now be apparent to one skilled in the art upon reading the specification and it is intended to cover such modifications as fall within the scope of the appended claims.

What is claimed is:

1. An electromagnetic variable valve means for use in a hydraulic braking system comprising:
   (a) a valve housing having an inlet and an outlet;
   (b) a valve stem block within said valve housing and having a valve stem aperture therethrough;
   (c) a valve stem slidably mounted within the valve stem aperture of said valve stem block and having a first end and a second end, said first end being conical in shape;
   (d) a plate of magnetic material adjacent the second end of said valve stem;
   (e) a conical valve stem seat adjacent said inlet for receiving said first end of said valve stem;
   (f) electromagnet means positioned annularly around said valve stem block; and
   (g) control means for supplying variable electric current to said electromagnet means to thereby selectively move said plate toward said electromagnet means and said first end of said valve stem toward said valve seat.

2. A hydraulic brake actuating device for use in a towed vehicle having hydraulic brakes which is towed by a towing vehicle comprising:
   (a) an elongated cylinder having a top plate and a bottom plate, said top plate having a piston rod aperture extending therethrough and said bottom plate having a fluid outlet aperture extending therethrough;
   (b) a shaft extending upward from said bottom plate of said cylinder and having a fluid inlet aperture extending therethrough;
   (c) a piston slidably mounted within said cylinder;
   (d) a piston rod affixed to said piston and being slidably mounted within said piston rod aperture and having a shaft receiving aperture at the lower end thereof axially aligned with the shaft extending upward from said bottom plate and a locking pin receiving aperture in the upper end thereof;
   (e) a helical spring around said piston rod and between said top plate and said piston; and
   (f) a locking pin means receivable in the locking pin aperture of said piston rod for locking said piston rod in position with respect to said cylinder once said helical spring has been placed under compression.

* * * * *